United States Patent [19]

Becker

[11] 3,739,394

[45] June 12, 1973

[54] METHOD AND APPARATUS FOR STORING INFORMATION IN A MAGNETO-OPTICAL MEMORY

[75] Inventor: Manfred Becker, Munich, Germany

[73] Assignee: Siemens Aktiengesellschaft, Berlin and Munich, Germany

[22] Filed: Aug. 26, 1971

[21] Appl. No.: 175,101

[30] Foreign Application Priority Data

Sept. 3, 1970 Germany.................. P 20 43 766.5

[52] U.S. Cl..................... 346/74 MT, 179/100.2 CR

[51] Int. Cl............................................. G11b 7/02

[58] Field of Search............................. 346/74 MT; 179/100.2 CR; 340/174.1 A; 178/7.6

[56] References Cited

UNITED STATES PATENTS

| | | | |
|---|---|---|---|
| 3,611,415 | 10/1971 | Nelson | 346/74 MT |
| 3,631,415 | 12/1971 | Aagard | 346/74 MT |
| 3,495,036 | 2/1970 | Clayton | 178/7.6 |
| 3,426,337 | 2/1969 | Black et al. | 340/174.1 A |
| 3,164,816 | 1/1965 | Chang et al. | 346/74 MT |
| 3,626,114 | 12/1971 | Lewicki | 346/74 MT |

*Primary Examiner*—Vincent P. Canney
*Attorney*—Carlton Hill, Benjamin H. Sherman, J. Arthur Gross et al.

[57] ABSTRACT

The present invention is directed to a method and apparatus for recording information in a magneto-optical memory and for retrieving the information therefrom. The method comprises preparing a storage medium of the memory by applying a magnetic field of one polarity to the storage medium, heating the storage medium to a temperature above the Curie temperature to enable the induced magnetism therein to be in a direction according to the polarity of the magnetic field and maintaining the magnetic field as the storage medium cools below the Curie temperature. To record information on the medium, discrete portions of the medium have the direction of magnetism switched which is accomplished by applying a second magnetic field of a different polarity and selectively heating the discrete portions above the Curie temperature to enable switching of the direction of magnetism in the heated portions of the storage medium. To retrieve information from the memory, the medium is scanned with a linearly polarized light beam whose polarization is changed by the switched direction of magnetism which changes in polarization are converted by an analyzer to an intensity modulated light beam detected by a light detecting device which converts the signal into electrical signals. To prepare the storage medium for recording and to record, a laser is utilized to heat the medium above the Curie temperature and during recording the beam is intensity modulated in accordance to the information to be recorded and scanned on the medium in a line by line manner.

8 Claims, 9 Drawing Figures

INVENTOR
Manfred Becker
BY
Hill, Sherman, Meroni, Gross & Simpson
ATTYS

INVENTOR
Manfred Becker
BY
Hill, Sherman, Meroni, Gross & Simpson
ATTYS

Patented June 12, 1973 3,739,394

3 Sheets-Sheet 3

INVENTOR
Manfred Becker
BY
Hill, Sherman, Meroni, Gross & Simpson
ATTYS.

METHOD AND APPARATUS FOR STORING INFORMATION IN A MAGNETO-OPTICAL MEMORY

BACKGROUND OF THE INVENTION

1. Field of the Invention

The present invention relates to a method and apparatus for storing information in a magneto-optical memory.

2. Prior Art

A magneto-optical material, such as MnBi, will pass a polarized laser beam and due to the direction of magnetism of the material will cause a rotation of the polarized light in accordance with the Faraday effect or the Kerr effect. This change in the direction of polarization can be utilized to determine the direction of magnetism of the material. The magneto-optical material, such as MnBi, can have the direction of magnetism switched or changed by heating the material to a temperature above the Curie temperature and then cooled therebelow while simultaneously being permeated by the magnetic field of a given polarity. The resulting direction of magnetism of the material will depend on the polarity of the magnetic field being applied to the material as it is heated above the Curie temperature and cooled therebelow. Thus it has been proposed to produce a magneto-optical memory by switching discrete ranges or portions of the magneto-optical material to have a different direction of magnetism from the remaining material which ranges would represent information recorded. However, in order to record information on a storage medium of the magneto-optical material, the heating of localized or discrete portions is necessary.

SUMMARY OF THE INVENTION

The present invention is directed to a method and apparatus for providing a magneto-optical memory from which information can be retrieved at a faster rate than from prior art magnetic layer memories and which memories are less expensive to produce. The method for recording information in the memory includes preparing the storage medium for recording by magnetizing the medium in one direction by applying a magnetic field of one polarity and, while the field is applied, heating the medium above its Curie temperature by utilizing a light beam. Then recording of the information on the storage medium by switching the direction of magnetism of discrete portions of the medium in accordance with the information to be recorded by applying a magnetic field of another polarity and by heating the localized or discrete portions by a scanning light beam modulated in accordance with the information to be recorded onto the memory. In retrieving information from the memory, a linearly polarized light beam, such as a low intensity laser beam, is projected on the storage medium in a line by line scanning and the switched portions of the medium will cause a rotation in the direction of polarization of the light which rotations are converted by an analyzer into a light intensity modulation received by a light detector which converts the modulated light into electrical signals. An apparatus for performing the method utilizes a laser beam, means including a modulator and a polarizer for intensity modulating the laser beam, means for moving the beam relative to the medium in both the vertical and horizontal directions for a line by line scanning of the medium, means for focusing the beam on the medium, means for applying a magnetic field of different polarities onto the medium, and control means for controlling the modulator and the scanning means. To retrieve the information, the above apparatus can include an analyzer for receiving the beam passing through the storage medium and for converting it to an intensity modulated beam and a light detecting means for converting the intensity modulated into electrical signals. The circuit means preferably includes a motion pickup for timing and synchronizing the position of the beam on the storage medium.

DESCRIPTION OF THE PREFERRED EMBODIMENT

Figure 1:
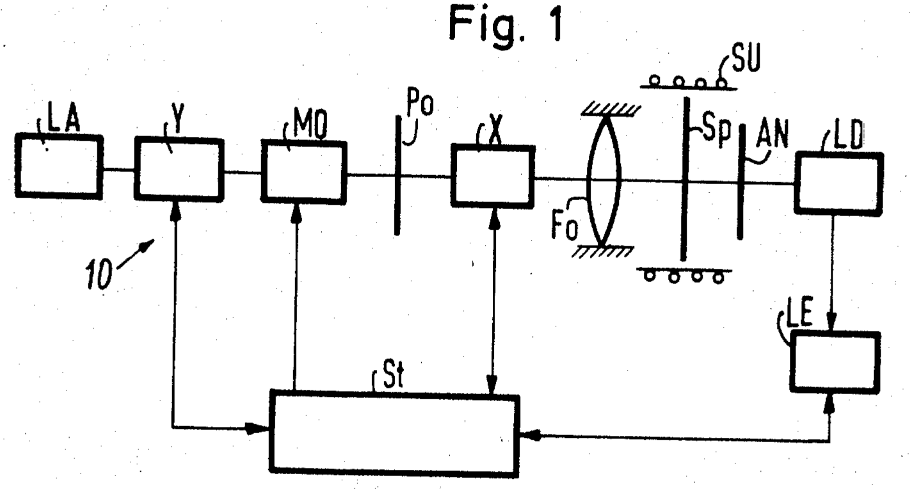
FIG. 1 is a schematic illustration of an apparatus performing the method of the providing a magneto-optical memory of the present invention.

The principles of the present invention are particularly useful in an apparatus of a magneto-optical memory generally indicated at 10 and schematic illustrated in FIG. 1 for performing the method of the invention. The apparatus 10 includes a continuous wave laser LA which provides a laser beam or light beam utilized for recording and for retrieving information from a storage medium Sp which forms the memory and contains a layer of magneto-optical material such as MnBi. The light beam generated by the laser LA is intensity modulated by means including a modulator MO coacting with a polarizer Po and is directed through a lens system Fo which focuses the modulated light beam to provide the necessary energy density which is required for recording and to keep the size of the beam relatively small as it strikes or projects on the storage medium Sp.

To deflect the laser for scanning the storage medium in a line by line manner similarly to the scanning of a television tube, scanning means including a vertical deflection device Y and a horizontal deflection device X are provided in the path of a light beam between the laser LA and lens system Fo.

To apply a magnetic field to the storage medium Sp, a coil SU is provided and is connected to an electrical source to produce a magnetic field where polarity can be changed to be either one of two different polarities.

During reading of the storage medium Sp, a laser beam of a lower intensity then the beam used for recording is passed through the scanning means, the polarizer Po, the lens system Fo, the storage medium Sp, an analyzer AN onto a light detector LD which may be a photomultiplier type light detection device. Any rotation of the polarization plane of the laser beam causes by the direction of magnetism of the storage medium Sp is determined by the analyzer which converts a rotation of the polarization into an intensity modulation which is detected by the light detector LD which transforms the intensity modulated light into an electrical signal which is then delivered to an electronic reading device LE.

The apparatus 10 includes a control means St which provides information to the modulator MO to impart the modulation onto the light beam, and has circuits for operating the vertical deflection device Y and horizontal deflection device X of the scanning means for controlling the synchronization or timing of the scanning beam during retrieving and recording of information on the storage medium Sp.

Figure 2:
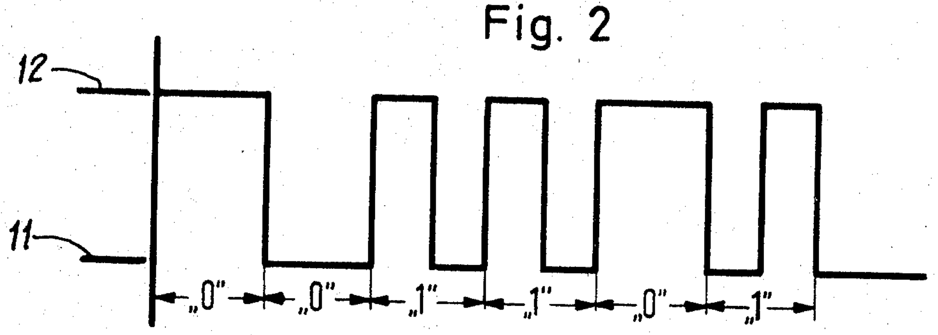
FIG. 2 is a diagram of the pulse coded modulation utilized in recording information while practicing the present invention.

The modulator MO can be of a known type which linearly polarizies the laser or light beam and then shifts the rotation of the polarization plane of the linearly polarized laser beam in accordance with the information to be recorded. Once the modulated light goes to the polarizer Po, any residual polarization is diminished so that the intensity of the laser beam depends on the amount of rotation of the polarization applied by the modulator Mo. Preferably the modulation is in the form of a pulse code modulation which is illustrated in FIG. 2 and varies between a level 11 and level 12. At the level 11, the intensity of the laser beam is insufficient to heat the storage medium Sp above its Curie temperature so that the directions of magnetism of the medium prior to recording will not be effected. At the level indicated at 12, the intensity is of a sufficient amount to heat the storage medium to a temperature above the Curie temperature to allow shifting of the direction of magnetism in the storage medium to a new direction induced by the magnetic field applied by the coil SU. The pulse code modulation is a binary code in which a pulse at either the intensity level 11 or level 12 for a given time interval is a zero; but a change in the intensity during a time interval has a value of 1.

Figure 3:
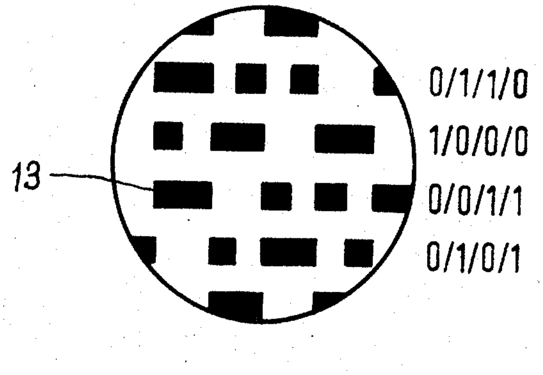
FIG. 3 is a partial view or portion of a storage medium of the memory diagramatic illustrating the information content recorded thereon.

When a pulse code modulation is recorded on the storage medium Sp, pulses at level 12 will be projected on a portion and cause a shifting of the direction of magnetism while the areas or portion on which the pulse at level 11 strike will retain the direction of magnetism of the medium prior to recording. In FIG. 3, the areas in which a shift of direction of magnetism occurred during recording are diagramatical shown as dark areas and areas in which the direction of magnetism is unchanged are shown as white or light areas. Each of the recorded lines illustrated in FIG. 3 have the code or information indicated next to the line. The recording of the information of the pulse code modulation illustrated in FIG. 2 would produce a recorded line shown at 13 in FIG. 3 with a zero indicated by switched area, a zero indicated by an unswitch area, a one indicated by short switch area and short unswitch area, and a second one area followed by a zero indicated by a switch area.

In order to keep the cost of the recording as low as possible, the information is preferably not recorded as dot by dot manner, but line by line onto the memory Sp such as in a television tube. Deflection in the line direction (horizontal direction) can be accomplished by using a mirror which rotates at a constant speed with the vertical deflection device then selecting the desired line on which the information is to be recorded. This recording method has two essential advantages. The first advantage is the modulation of the light beam can be the pulse code modulation which is particularly adapted for a band or plate memories and is a well known form of modulating information. The second advantage is the possibility of erasing a single line or an entire storage medium before recording with the help of the laser beam and the magnetic field applied by the coil SU.

Erasing or preparing the memory for recording comprises applying a magnetic field with a desired polarity to produce a desired direction of magnetism in the storage medium Sp and then projecting the laser beam of an intensity sufficient to heat the storage medium above the Curie temperature on the line or lines being erased or the entire medium if it is to be erased. After cooling, the storage medium will now have a desired direction of magnetism. To record a magnetic field of a different polarity is applied to the storage medium by changing the current flow through the coil SU and then the laser beam as modulated with the information to be recorded is projected onto the storage medium to heat discrete portions to the Curie temperature to enable switching of the direction of magnetism in the heated areas. An advantage of the system is that the erasing and recording are not accomplished in a dot by dot sequence but are done by erasing and recording at least one line at a time. Thus the speed of erasing and recording is greatly increased over the speed of a bit by bit erasing and recording process since no time is lost by the constant repoling of the magnetic field created by the coil SU before each bit of information is recorded. Furthermore, since the switching of the direction of the magnetism in the storage medium does not become permanent until the temperature of the heated portions drops below the Curie temperature, the time lag required for cooling in a bit by bit erasing and recording process does not occur.

Figure 4:
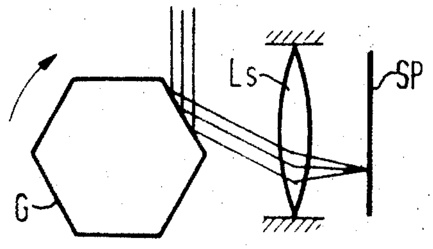
FIG. 4 is a schematic illustration of a means for providing the scanning in a horizontal direction during recording and retrieving information in accordance with the present invention.

To deflect the laser beam horizontally on the storage medium Sp, a horizontal deflection means X of FIG. 1 can utilize a rotating mirror G illustrated in FIG. 4. The constant changing of the mirror surface with respect to the beam of the laser cause a sweeping of the focused beam along a line on the memory formed by the storage medium which is positioned in the focal plane of the lens LS. In order to avoid unnecessary delays for repositioning the mirror between sweeps, the mirror G is preferably a polygon shaped mirror. In a similar manner, a rotating mirror can be utilized for the vertical deflecting device Y of FIG. 1.

Figure 5:
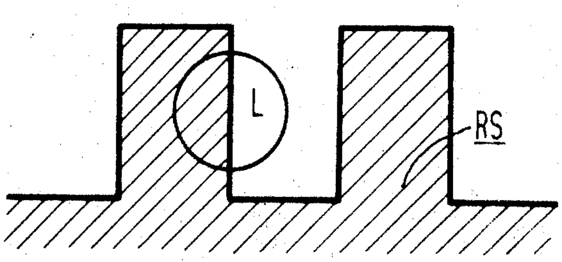
FIG. 5 is a schematic illustration of the principles utilized in a motion pickup of the present invention.
Figure 6:
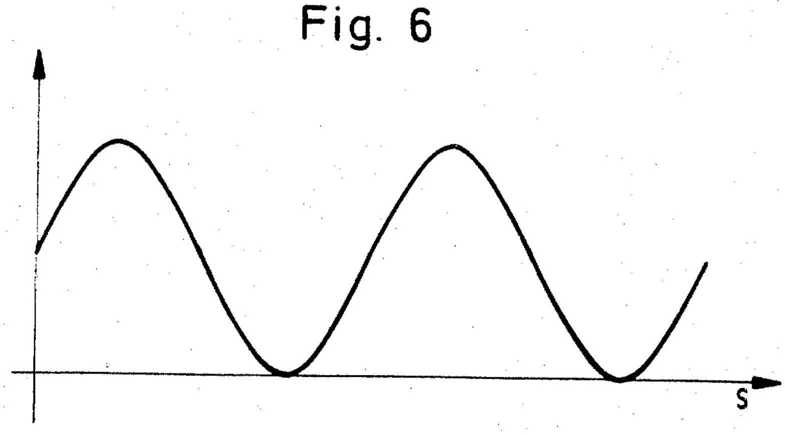
FIG. 6 is an intensity curved for the light modulated by the motion pickup such as illustrated in FIG. 5.
Figure 7:
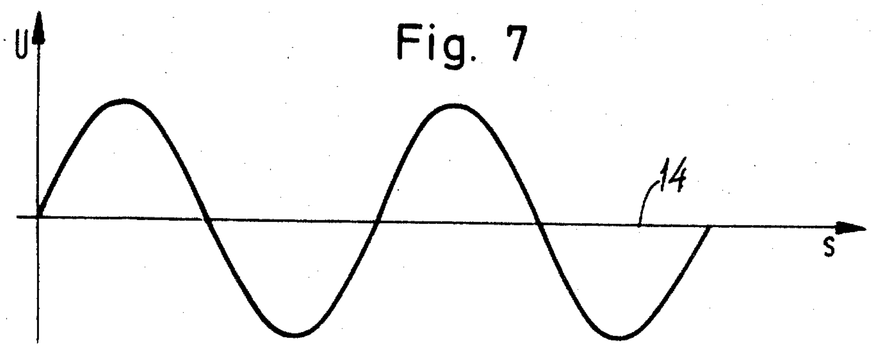
FIG. 7 is a voltage curve which is produced utilizing the motion pickup of FIG. 5.

In operation of the apparatus for recording and for retrieving information from the memory, a motion pickup for timing or synchronizing the sweep of the beam with respect to the storage medium Sp is required and is included as part of the control means St. An example of a motion pickup is illustrated in FIG. 5 and comprises a bright-dark raster RS and a light source L. As the light L moves along the raster, a light detector, such as a photocell, will pick up the changes in brightness to produce a sine curve illustrated in FIG. 6 for movement on a raster on a path S. If the average value for the intensity measured by a photocell for the light source L moving along the raster is subtracted from the intensity curve of FIG. 6, a sine curve of FIG. 7 will result and illustrates a change in voltage U for movement along the path S with zero voltage at line 14. By counting the zero voltage (crossing of line 14), a course indication for the position of the beam is obtained and for fine adjustment, the almost linear path of the voltage curve at each crossing of the zero voltage line is utilized.

The bright-dark raster RS is preferably provided on the storage medium since movement of the light beam on the storage medium can then be easily determined. Such a provision can be effected by etching the MnBi layer at an edge of the storage medium as indicated in FIG. 8.

Figure 8:
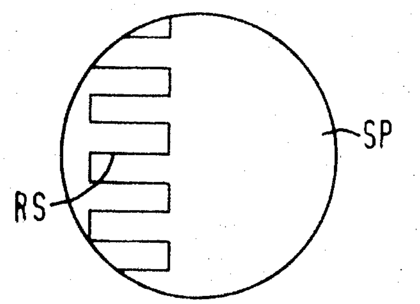
FIG. 8 is a partial view or portion of the storage medium of the present invention illustrating an embodiment of the motion pickup provided thereon.
Figure 9:
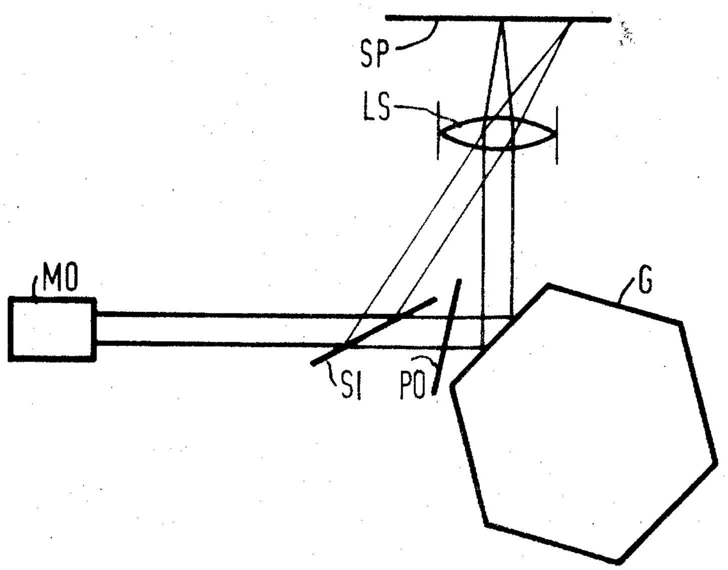
FIG. 9 is a partial schematic illustration of a magneto-optical memory of the present invention illustrating the use of the motion pickup.

To provide a light source L for the motion pickup, a reference beam is separated from the laser or light beam by utilizing a partially permeable mirror SI as illustrated in FIG. 8. Since the amplitude modulation of the light beam is provided by the coaction between the modulator MO and the polarizer Po, the mirror SI is positioned in the path of the beam prior to its passing through the polarizer Po so that the reference beam reflected on the raster RS is not intensity modulated. As illustrated, the motion pickup of FIG. 9 would indicate a vertical position and utilizes the movement of the polygon mirror G for determining horizontal position of the beam during recording and reading.

A particular advantage of the magneto-optical memory according to the present invention is that the storage medium is interchangeable and a series of cards or tapes with information recorded on it can be read by the same apparatus. In other words, the data carriers are interchangeable in a manner similar to a card memory which results in a large increase in the storage capacity for the particular apparatus.

In the above described example of an apparatus for performing the method of recording information on a magneto-optical memory and for retrieving information, a specific example of an apparatus was described for performing the invention. However, modifications to the example of the apparatus can be effected, such as modifications in the X and Y deflection devices, the light source and the motion pickup of the control circuit. For example to accomplish the deflection in both the horizontal and vertical direction for scanning the entire medium, the beam of the laser can be deflected in a horizontal direction for a line by line scanning and the storage medium moved in a vertical direction to obtain the relative vertical movement required for a complete scanning of the medium. However, in making modifications to the apparatus it is essential that the information is always recorded in a line by line sequence on the storage medium.

Although minor modifications might be suggested by those versed in the art, it should be understood that I wish to embody within the scope of the patent warranted hereon all such modifications that reasonably and properly come within the scope of my contribution to the art.

I claim:

1. A method of recording information in a magneto-optical memory having a storage medium with a residual magnetism whose direction of magnetism depends upon the polarity of a magnetic field application to the medium as the medium is heated to a temperature above the Curie temperature of the medium and cooled therebelow, said storage medium having a bright-dark raster disposed on a surface thereof, the method comprising:

preparing the storage medium for recording by applying a magnetic field of one polarity thereto and heating the storage medium while subject to the magnetic field to a temperature above the Curie temperature by the application of a light beam to impose the direction of magnetism to the storage medium in accordance to the polarity of the magnetic field; and then recording information on the storage medium by switching the direction of magnetism in discrete portions of the medium in accordance with the information to be recorded the step of recording comprising:

applying a magnetic field of a second polarity different to said one polarity, providing a light beam and separating the light beam into two portions, and applying one portion of the light beam to the storage medium with a line by line scan and the other portion of the light beam on the raster to determine the portion of the line by line scan, while said medium is subject to said magnetic field of said second polarity, said one portion of the light beam being modulated in intensity in accordance with the information to be recorded to selectively heat the discrete portions of the storage medium above the Curie temperature to enable switching of the direction of magnetism of said discrete portion.

2. A method according to claim 1, wherein the modulation light beam is a pulse code modulation.

3. A method according to claim 1, wherein the step of preparing is applied to a line on the storage medium followed by the step of recording on the prepared line to minimize time loss for repoling the polarity of the field applied to the storage medium between the step of preparing and the step of recording.

4. An apparatus for recording information in a magneto-optical memory having a storage medium with a residual magnetism whose direction of magnetism depends upon the polarity of a magnetic field applied to the medium as the storage medium is heated to a temperature above the Curie temperature of the medium and cooled therebelow, said storage means having a bright-dark raster provided on a surface thereof, said apparatus comprising:

a laser for the production of a light beam;

means comprising a modulator and a polarizer for intensity modulating the light beam in accordance for the information to be recorded;

scanning means for moving the light beam relative to the storage medium in a vertical and horizontal direction to produce a line by line scanning of the storage medium;

means for focusing the light beam onto the storage medium;

means for applying a magnetic field of a desired polarity to the storage medium; and control means for controlling the scanning means and the modulator of the modulating means said control means including a motion pickup means for providing the respective beam position on the storage means, said motion pickup means including a partially-permeable mirror arranged in the path of the light beam prior to the polarizer for reflecting a portion of the light beam therefrom and directing the portion onto the raster of the storage medium and a light detector arranged to receive the light modulated by the bright-dark raster.

5. An apparatus according to claim 4 characterized in the scanning means includes a continuously rotating polygon mirror for deflecting the light beam across the storage medium in a horizontal direction.

6. An apparatus according to claim 4, wherein the bright-dark raster is etched onto the storage medium.

7. An apparatus according to claim 4 which further includes means for reading information recorded on a storage medium comprising an analyzer and a light detector, said analyzer converting rotational changes in the polarized light beam imparted by the information recorded on the storage medium into a light intensity modulation which is detected by the light detector.

8. An apparatus according to claim 4, wherein the storage medium is interchangeable.

* * * * *